United States Patent
Melen

[11] Patent Number: 5,809,172
[45] Date of Patent: Sep. 15, 1998

[54] NON-LINEAR AGGREGATION MAPPING COMPRESSION OF IMAGE DATA AND METHOD

[75] Inventor: Roger D. Melen, Los Altos Hills, Calif.

[73] Assignee: Canon Kabushiki Kaisha, Tokyo, Japan

[21] Appl. No.: 634,059

[22] Filed: Apr. 17, 1996

[51] Int. Cl.$^6$ ...................................................... G06K 9/00
[52] U.S. Cl. ........................................... 382/232; 382/274
[58] Field of Search .................................. 382/166, 168, 382/172, 173, 181, 190, 209, 232, 224, 233, 234, 235, 236, 237, 238, 239, 240, 244, 248, 251, 252, 253, 254, 270, 272, 273, 274, 275, 309, 284, 293, 276, 277, 278, 302, 307, 308; 434/43, 38; 395/126, 127, 135, 501, 131; 345/200, 136; 340/980

[56] References Cited

U.S. PATENT DOCUMENTS

| | | | |
|---|---|---|---|
| 4,645,459 | 2/1987 | Graf et al. | 434/43 |
| 4,667,190 | 5/1987 | Fant | 340/747 |
| 4,835,532 | 5/1989 | Fant | 340/728 |
| 5,394,523 | 2/1995 | Harris | 395/162 |

*Primary Examiner*—Leo H. Boudreau
*Assistant Examiner*—Bijan Taddayon
*Attorney, Agent, or Firm*—Paul Hentzel

[57] ABSTRACT

General apparatus 10 for carrying out non-linear aggregation compression and storage of pixel data is presented. Scanner device 10S receives record documents 10R containing record images 10D for providing analog data 10A. Analog-to-digital converter 12A digitizes the amplitudes of the analog data to provide digital data stream 12D. Mapping device 14 defines a non-linear series of aggregation segments (A, B, C ... X, Y, and Z) along the scale of intensity which are aggregated to an aggregation level (a, b, c, ... x, y, or z) within each segment. The basic steps of the general method are: Retrieving pixel image data from a data source to form data stream 12D; Defining a non-linear series of aggregation segments; Determining an aggregation level within each aggregation segment; Aggregating the intensity scale levels within each aggregation segment; Compressing the aggregated pixel data; and Storing the non-linearly aggregated pixel data in a memory device.

47 Claims, 3 Drawing Sheets

Fig 2

Fig 3

NON-LINEAR AGGREGATION MAPPING COMPRESSION OF IMAGE DATA AND METHOD

TECHNICAL FIELD

This invention relates to compression of image data for reducing the storage requirements thereof, and more particularly to non-linear aggregation mapping of such image data.

BACKGROUND

Heretofore database storage requirements were reduced by pixel decimation compression which resulted in a severe data loss. In a simple 4:1 pixel decimation, each image cell of four adjacent pixels was replaced by a single larger pixel. The storage requirement was correspondingly reduced by a factor of 4:1. Unfortunately, the 4:1 loss of pixels also reduced the image resolution by 4:1. In 16:1 pixel decimation compression, 16 pixels in a 4×4 square were replaced by a single larger pixel producing greater reductions in storage and loss of resolution.

Database storage requirements were also reduced by greyscale decimation compression. In 2:1 greyscale decimation, two adjacent greyscale levels along the scale of grey were replaced by a single greyscale level, reducing the greyscale levels by one half. The greyscale data was repacked into one half as many greyscale levels over the same greyscale range. One less greyscale bit was required to store the reduced greyscale data; but the greyscale resolution was also reduced by one half. In 4:1 greyscale decimation, four adjacent greyscale levels were combined eliminating two greyscale bits. The number of data pixels remained the same in greyscale decimation, however the number of greyscale transitions was reduced permitting longer run-lengths during run-length compression. The data loss introduced by this prior greyscale decimation compression was linear. Each region along the scale of grey was decimated equally with the same greyscale data loss.

U.S. patent application Ser. No. 08/112,133, filed 26 Aug. 1993 (now abandoned) to Roger D. Melen and Hadar Avi-Itzhak, and assigned to the present assignee, involves greyscale decimation compression of the background and foreground pixels of the image. A single background greyscale level and a single foreground greyscale level was employed in the unknown input symbol data to match the single background and foreground levels of the character templates in memory. The classification of the unknown symbol against the template library produced a more reliable match with a higher correlation coefficient.

U.S. Pat. No. 5,219,787, issued May 21, 1996 (Ser. No. 08/279,560, filed 25 Jul. 1994) to Roger D. Melen, and assigned to the present assignee, also involves greyscale decimation of the background and foreground pixels. A single background greyscale level and a single foreground greyscale level was employed reduce the number of greyscale transitions for enhancing run-length compression. In a typical text document, the low intensity background levels typically accounted for over 90% of the data pixels and the area if the document.

SUMMARY

It is therefore an object of this invention to provide an improved apparatus and method of greyscale decimation mapping compression.

It is another object of this invention to provide such an improvement method which employs a non-linear series of greyscale segments along the scale of grey.

It is another object of this invention to provide such an improvement in which regions of high interest along the scale of grey are not greyscale decimated but remain fully preserved.

It is another object of this invention to provide such an improvement in which regions of low interest along the scale of grey are greyscale decimated and subject to partial data loss.

It is another object of this invention to provide such an improvement in which regions of higher interest are not greyscale decimated as much as regions of lower interest and therefore subject to less data loss.

Briefly, these and other objects of the present invention are accomplished by providing a method of non-linearly aggregating and storing pixel data comprising the following steps.

Retrieving pixel data from a data source. The pixel data having levels of intensity scale which define information contained within the pixel data. The intensity scale levels extend along a scale of intensity from a minimum intensity end to a maximum intensity end with center intensity scale levels therebetween.

Defining a non-linear series of aggregation segments along the scale of intensity of the retrieved pixel data. Short segments in the series are formed by S intensity scale levels, and have the same length. Extended segments in the series have varying lengths formed by more than S intensity scale levels.

Determining an aggregation level within each aggregation segment. Each aggregation level corresponding to an intensity scale level within the aggregation segment.

Aggregating the intensity scale levels within each aggregation segment, by setting all of the intensity scale levels therein to the aggregation level for that segment.

Storing the non-linearly aggregated pixel data in a data storage device.

BRIEF DESCRIPTION OF THE DRAWING

Further objects and advantages of the present data aggregation decimation method and the non-linear series of aggregation segments will become apparent from the following detailed description and drawing (not drawn to scale) in which.

The elements of the invention are designated by two digit reference numerals in the above figures. The first digit indicates the figure in which that element is first disclosed or is primarily described. The second digit indicates like features and structures throughout the figures. Some reference numerals are followed by a letter which indicates a sub-portion or related feature of that element.

Figure 1:
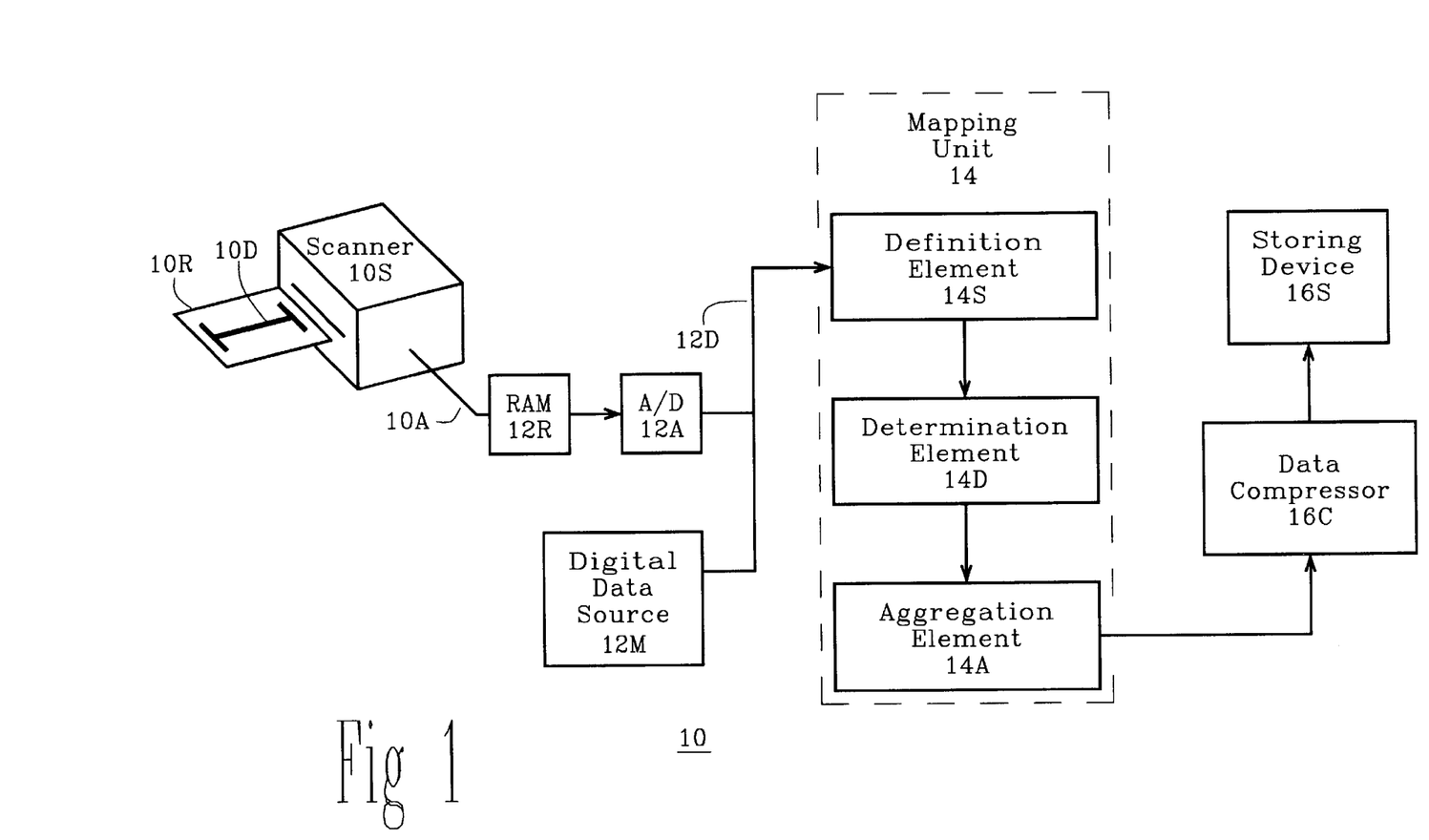
FIG. 1 is a functional block diagram of apparatus for carrying out the present method.
Figure 2:
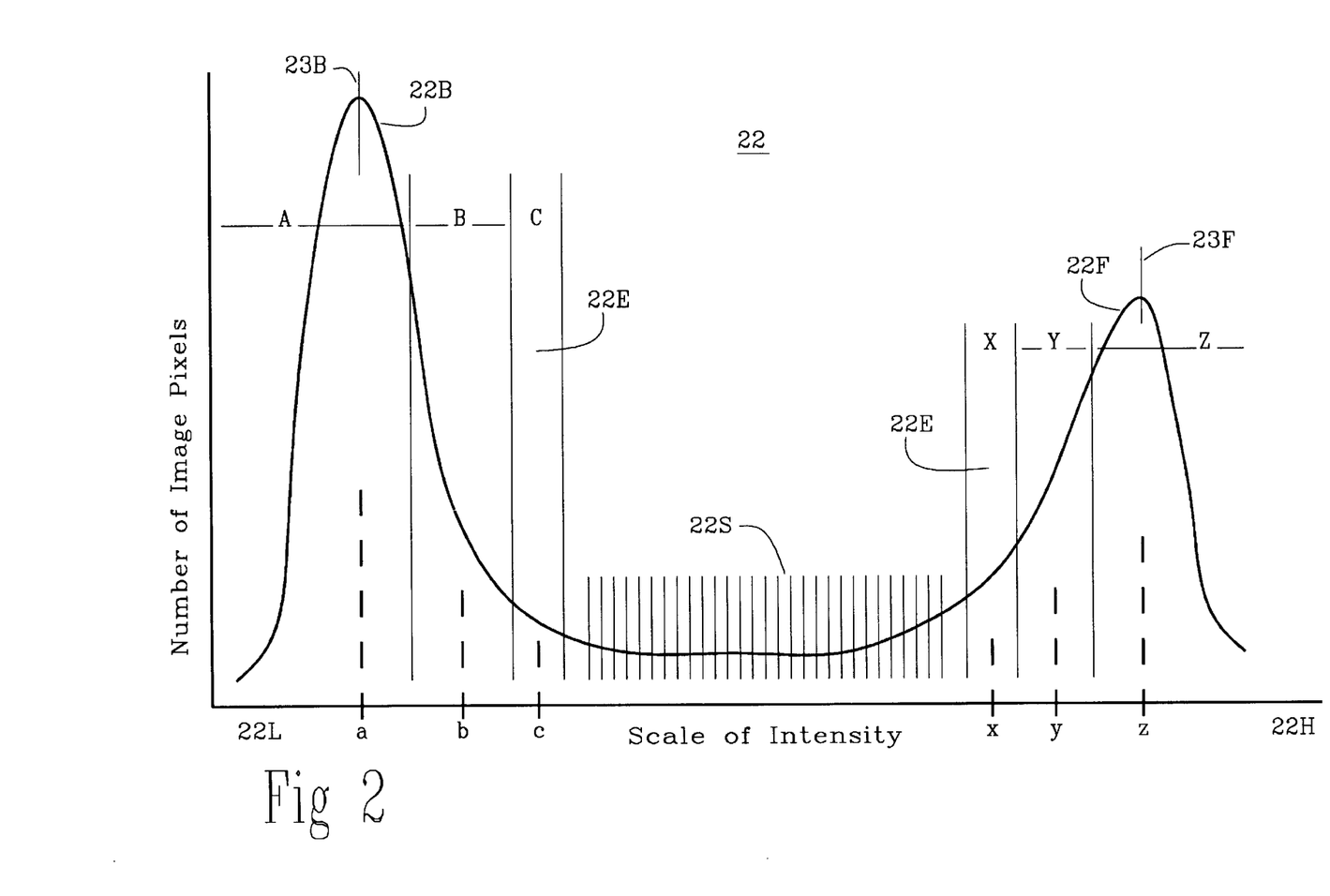
FIG. 2 is a histogram of general image data showing the aggregation segments and aggregation levels within the non-linear series.

GENERAL APPARATUS AND METHOD (FIGS. 1 and 2)

General apparatus 10 for carrying out the present method of non-linear aggregation compression and storage of pixel data is shown in FIG. 1. Scanner device 10S receives record documents 10R containing record images 10D for providing analog data 10A. Analog-to-digital converter 12A digitizes the amplitudes of the analog data to provide digital data stream 12D. The digital data has levels of intensity scale (greyscale) defining information contained within the record image. The digital pixel data from a typical record document is displayed in histogram 22 shown in FIG. 2. The scale of intensity is presented along the horizontal axis from a minimum intensity end 22L to a maximum intensity end 22H with center intensity scale levels therebetween. In order to simplify the histogram display, only 64 greyscale levels are employed along the horizontal scale of intensity. The vertical scale (logarithmic) reveals the number of image pixels at each intensity scale level. Very tall low intensity peak 22B is formed by the light background pixels of the digital image data. In a typical text record documents, the background accounts for about 90% of the image pixels. Shorter high intensity peak 22F is formed by the dark foreground pixels formed by the printed text (or other image). Mapping unit 14 defines a non-linear series of aggregation segments (A, B, C . . . X, Y, and Z) along the scale of intensity which are aggregated to an aggregation level (a, b, c, . . . x, y, or z) within each segment.

The basic steps of the general method carried out by the apparatus of FIG. 1 are summarized below and described in detail hereinafter.

Retrieving pixel image data from a data source to form data stream 12D of digital image data (see Data Retrieval section). The retrieval step may include the steps of scanning a data source document to obtain analog pixel data, and then converting the scanned data into digital pixel data. Alternatively, the retrieval step may involve addressing the pixel data stream directly from a suitable data memory device such as digital data source 12M to provide the digital data. In the latter case, the retrieved image data is already digital, and the scanning step and A/D conversion step are not required.

Defining a non-linear series of aggregation segments along the scale of intensity of the retrieved pixel data (see Non-linear Series section). The series includes short segments 22S each having the same length formed by S intensity scale levels. The series also includes extended segments 22E having varying lengths formed by more than S intensity scale levels. In an S=1 embodiment, the number of intensity scale levels in each short aggregation segment is 1, forming a single level segment. All intensity scale information in these single level segments is preserved. The number of intensity scale levels in the extended aggregation segments is greater than 1 forming multiple level segments. The extended segments have a partial loss of intensity scale information. In the mapping device embodiment of FIG. 1, the step of defining the series of aggregation segments is be accomplished by definition element 14S within mapping RAM 14. The RAM receives the digital data pixels and maps each intensity scale level therein to a segment of the series of aggregation segment.

Determining an aggregation level within each aggregation segment of the segmented scale of intensity (see Aggregation Level section). Each aggregation level corresponds to an intensity scale level within the aggregation segment. In the mapping device embodiment of FIG. 1, the step of determining the aggregation level within each aggregation segment is accomplished by determination element 14D within mapping RAM 14. The RAM assigns one of the intensity scale level within each aggregation segment as the aggregation level therefor.

Aggregating the intensity scale levels within each aggregation segment of the segmented scale of intensity by setting all of the intensity scale levels therein to the aggregation level for that segment. The aggregation step introduces partial loss of intensity scale information in aggregation segments having more than one intensity scale level. The amount of intensity scale information lost from each aggregation segment is greater as the length of the segment increases. In the mapping device embodiment of FIG. 1, the step of aggregating the intensity scale levels within each aggregation segment is accomplished by aggregation element 14A within mapping RAM 14. The RAM simply maps all of the intensity scale levels within each aggregation segment to the aggregation level therefor.

Compressing the aggregated pixel data to reduce the data storage requirements therefor, using a suitable transition filter device such a data compressor 16C. This data compression may be lossless compression based on run-length encoding. The data may be further compressed by JPEG compression which is "lossey". A typical page of image text has about 15 megabits, and may be compressed to about 1.5 megabits using run-length/JPEG compression. Mapping compression by decimation aggregation of the image intensity scale prior to run-length compression further reduces the data storage requirement.

Storing the non-linearly aggregated pixel data in a suitable memory device such as data storage device 16M such as a hard disk or central network memory.

DATA RETRIEVAL (FIG. 1)

The scanning may be effected by any suitable detecting apparatus such as scanner 10S employing an optical diode array of perhaps 2000 diodes along a record width of 8½ inches. Each diode defines the width of a single pixel in each pixel row across the image, and provides an entire column of pixels along the image as the source document is scanned. The height of the pixel rows is determined by the record document advance speed and the internal clock of the scanner. The data source document may be any suitable recording medium such as paper 10R. The image data retrieved by the scanner forms analog data 10A. The image data maybe from stroke based symbols (indicated by uppercase letter "I"), or continuous shaded images such as artwork and photographs. The shades of the analog data are converted into a predetermined number of discrete intensity scale levels by analog to digital converter 12A to provide digital data 12D.

Scanner distortion may be corrected by a suitable correction circuit such as a correction look-up table within correction RAM 12R. Discrete LEDS providing the scanning illumination may introduce an amplitude ripple in the scanner output. Each pixel column may be corrected to smooth (or at least partially reduce) the ripple. Other non-uniformities associated with the scanning light levels and photodiode detection may be corrected by adjusting the values in the correction lookup table.

Figure 3:
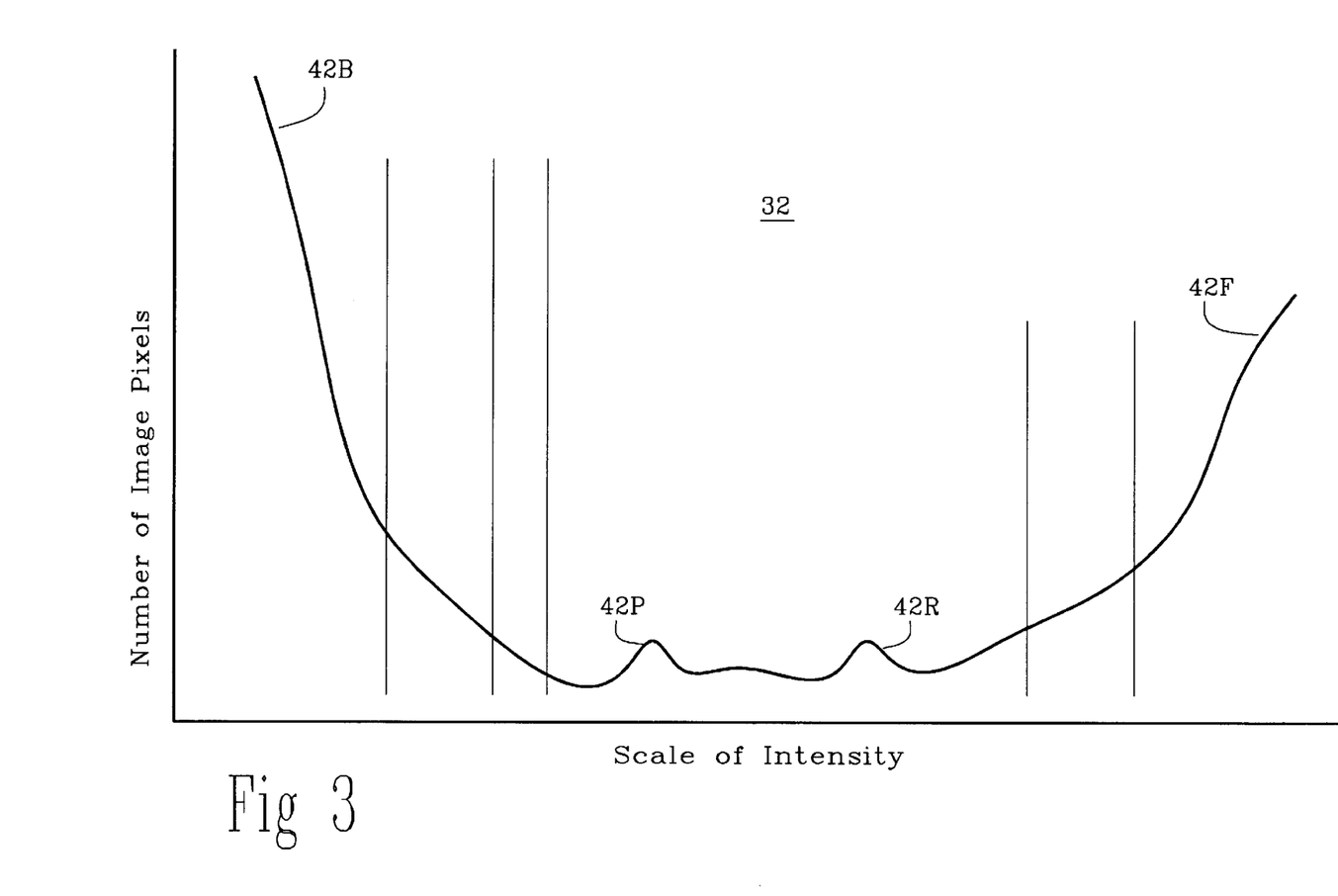
FIG. 3 is a histogram of black and white image data showing special regions of high information content.

The scale of intensity of correction RAM 12R may be calibrated at the high intensity end by scanning a pure white calibration card. The white calibration simulates the extreme light background of a pure white paper (or other recording medium). The correction RAM may also be calibrated at the low intensity end by dark scanning without illumination. The dark calibration simulates the extreme dark foreground of a perfectly black ink (or other pigment). The digital data scanned from a typical black and white text image using a black and white calibrated scale of intensity is displayed in histogram 32 shown in FIG. 3. Histogram 32 shows white background peak 32B (at minimum greyscale level zero)

and black foreground peak 32F (at maximum greyscale level 63). Paper with a slight background color hue provides a low intensity peak such as background peak 22B (see FIG. 2) slightly higher than the above zero white calibration intensity. Off black or ink with a foreground color hue provides a high intensity peak such as foreground peak 22F slightly lower than the above dark calibration intensity. The scanner may be calibrated against such tinted paper and colored ink. Generally the pixels in the end region between the background (or foreground) peak and the low (or high) intensity end do not contain intensity information from the original record document. These non-information regions are created when the scanner is calibrated over a wider range intensity scale than are present in the image. Color detectors may be employed in the scanner for providing a colorscale of intensity, such as a redscale from a red detector, a bluescale from a blue detector, and a greenscale from a green detector.

NON-LINEAR SERIES (FIG. 2)

The non-linear series of aggregation segments (A, B, C, . . . X, Y, and Z) along the scale of intensity may have a center region of adjacent short segments 22S as shown in histogram 22 of FIG. 2. Extended segments 22E as shown in FIG. 2 are near the minimum intensity end 22L and the maximum intensity end 22H. The endmost segments are the longest of the aggregation segments. The segments become shorter toward the center region containing the adjacent short segments. That is, number of intensity scale levels included in the extended segments may progressively changes along the scale of intensity, as shown in the embodiment of FIG. 2. These extended segments include progressively fewer intensity scale levels along the scale of intensity from the minimum intensity end 22L toward the center intensity scale levels, and from the maximum intensity end 22H toward the center intensity scale levels. Most of the decimation compression and most of the data loss occurs in the extended segments near the ends. The short segments in the center region have minimal compression and minimal data loss. The S=1 embodiment involves a center region of single level segments without compression or data loss.

In a progressively (or monotonically) decreasing embodiment, the extended segments become smaller from the minimum intensity end toward the maximum intensity end. In this case, the low loss short segments are located at the high intensity end, not in the center region as shown in FIG. 2. Alternatively, in a progressively increasing embodiment the extended segments become progressively larger, and the low loss short segments are located at the low intensity end.

Stroke Based Symbols

The FIG. 2 embodiment with a low loss center region and high loss ends is particularly suited to text and other stroke based images. Text images have stroke foreground pixels (near one end of the scale of intensity) which form the symbol and non-stroke background pixels (near the other end of the scale of intensity) which form the space around and between the stroke pixels. In accordance with common printing practices, the stroke pixels forming the body of the stroke tend to be high intensity having an average intensity value near foreground peak 22F with occasional outliers. Similarly, the non-stroke background pixels are predominantly pixels at or near background peak 22B. A few of the stroke pixels are transition pixels along the edge of the stroke, and border on the non-stroke pixels. These edge transition pixels form a sliver interface of transition ground pixels with stroke pixels on one side and non-stroke pixels on the other. The transition ground pixels have intensity scale values in the center region between the maximum and minimum intensity scale levels.

Ordered States

Stroke based text may be considered an information system having two ordered states, the background state and the foreground state. These two states which include most of the pixels in the text image. Under ideal printing and scanning conditions, each of the two ordered states has a single fixed intensity value. The background is ideally white and the foreground is ideally black. The transition ground pixels do not have an ideal fixed value, and form the "edge of chaos" between the order background and foreground states. Most of the intensity scale information in a stroke based system is in the varying shades of intensity of the transition ground pixels. Transition ground pixels are especially useful in classifying unknown characters. The closest matches may differ only be a few transition ground pixels. Also, the resolution of touching characters typically hinges on the transition ground pixels in the connecting bridge between the characters. The range of intensity shades forming the background peak (and foreground peak) may be aggregated into fewer background (or foreground) values with minimum loss of intensity scale information.

Stroke Based Mapping Examples

Each of the following examples of text mapping compression illustrates a non-linear series of aggregation segments along the scale of intensity. The segments in each example are larger at the ends to permit progressive non-linear aggregation of the background and foreground while maintaining linear aggregation of transition ground center region. For comparison purposes, each example has 256 premapping intensity scale levels, which are "repacked" into a smaller number of postmapping levels.

1) Small Center Region Example

| Number of Levels Background Segments | Number of Levels Transition Ground Segments | Number of Levels Foreground Segments |
| --- | --- | --- |
| 64 32 16 8 4 2 | 4 Single Level | 2 4 8 16 32 64 |

The background has six large segments of decreasing size. The background segment closest to the minimum intensity level is the largest with 64 intensity levels. The number of levels in the next five background segments progressively decrease by a factor of two. The foreground also has six segments with similar progressive increases. The center transition ground has four no loss single level segments. The large background segments results in pronounced greyscale decimation with high run-length compression. Further, the scale of intensity has been reduced from 256 premapping levels (requiring 8 bits in memory) to only 16 postmapping levels (requiring only 4 bits).

2) Large Center Region Example

| Number of Levels Background Segments | Number of Levels Transition Ground Segments | Number of Levels Foreground Segments |
| --- | --- | --- |
| 64 32 16 8 4 2 | 100 Single Level | 2 4 8 16 |

The background has six large segments of decreasing size from 64 to 2. The foreground has four large segments of increasing size from 2 to 16. The segment distribution is not symmetrical. The foreground segments are smaller and fewer in number. The foreground contains fewer pixels than the background, and therefore offers less potential for run-length compression. The transition ground has 100 single level segments. The large center region preserves most of the intensity scale information with less decimation; but provides less run-length compression.

3) S=2 Center Region Example

| Number of Levels Background Segments | Number of Levels Transition Ground Segments | Number of Levels Foreground Segments |
|---|---|---|
| 32 16 8 4 | 68 Two Level | 4 8 16 32 |

The background (foreground) has four segments of decreasing (increasing) size from 32 to 4 (4 to 32). The transition ground is formed of 68 two level segments. In the S=2 embodiment, half of the intensity scale information in the short segments is lost.

4) Large Center Region Example (8 bit to 7 bit)

| Number of Levels Background | Number of Levels Transition Ground | Number of Levels Foreground |
|---|---|---|
| 25 18 13 8 4 2 | 116 Single Level | 2 4 8 13 18 25 |

The background (foreground) has six segments of decreasing (increasing) size from 25 to 2 (2 to 25). The transition ground is formed of 116 single level segments. The scale of intensity has been reduced from 256 premapping levels (requiring 8 bits in memory) to only 128 postmapping levels (requiring only 7 bits).

In stroke based mapping, the lost background and foreground data and reduced dynamic greyscale range caused by large aggregation segments may be partially regained by interpolation reconstruction. The sequence of pixel intensity in not entirely random, but has a continuity between dark and light which is loosely predictable. A string of adjacent pixels which crosses a stroke transition ground are light in the background and decrease in lightness by steps as the chain passes through the transition ground. The pixels remain dark across the foreground and increase in lightness as the chain re-enters the light background. The change in intensity between adjacent pixels may be roughly calculated based on the lightness of the background and the darkness of the foreground, and the pixel width of the transition ground therebetween. The dynamic greyscale range lost through greyscale decimation may be approximately reproduced by interpolating greyscale values for reconstructed pixels between the preserved pixels.

General Statistical Mapping Example

Non-linear aggregation mapping for compressing data is not limited to images of stroke based symbols with high information content in the center region. Image data with minimum information in the center region and maximum information in the low intensity and high intensity ends may also be greyscale decimated. Short aggregation segments are employed in the ends of the scale of intensity to preserve the data, and large segments are employed along the center region to compress the data.

| Number of Levels Background | Number of Levels Transition Ground | Number of Levels Foreground |
|---|---|---|
| 26 Singles | 2 4 8 16 32 40 40 32 16 8 4 2 | 26 Singles |

The background and foreground each have 26 single level segments. The transition ground has 12 large segments of increasing (2 to 40) then decreasing (40 to 2). The large transition ground segments cause a large data loss with a corresponding high run-length compression. The scale of intensity has been reduced from 256 premapping levels (requiring 8 bits in memory) to only 16 postmapping levels (requiring only 4 bits).

Fundamental Segment Embodiment

The step of defining a non-linear background series of aggregation segments may include the following sub-steps for defining the background segments.

Identifying the dominant background intensity scale level near the background end of the scale of intensity having the most background pixels. In the FIG. 2 embodiment, the dominant background level is 23B.

Determining a fundamental background aggregation segment having B intensity scale levels which includes the dominant background level. In FIG. 2 B=!.

Defining a non-linear series of background aggregation segments each having a progressively decreasing number of intensity scale levels. The background segments begin with the fundamental background segment of B intensity scale levels and continue with smaller segments to a lower limit of one intensity scale level. The FIG. 2 embodiment has ! background segments. The step of identifying the dominant background level may further include the sub-steps of:

Providing Histogram Data of the pixel image which reveals the number pixels in each intensity scale levels in the background end of the scale of intensity, and Selecting the Background Intensity Level having the most pixels.

Similarly, the step of defining a non-linear foreground series of aggregation segments may include the following sub-steps for defining the foreground segments.

Identifying the dominant foreground intensity scale level (23F) near the foreground end of the scale of intensity having the most foreground pixels.

Determining a fundamental foreground aggregation segment having F intensity scale levels which includes the dominant foreground level.

Defining a non-linear series of foreground aggregation segments each having a progressively increasing number of intensity scale levels. The foreground segments begin with the fundamental foreground segment and continues with smaller segments. The step of identifying the dominant foreground level may further include the sub-steps of:

Providing Histogram Data of the pixel image which reveals the number pixels in each intensity scale levels in the foreground end of the scale of intensity, and Selecting the Foreground Intensity Level having the most pixels.

The fundamental background segment (or foreground segment) may extend from the background end (or foreground end) of the scale of intensity toward the center intensity scale levels; and include the dominant background level (foreground level) plus a !pre# of adjacent intensity scale levels on the center side of the dominant level. In the embodiment of FIG. 2, the pre# of adjacent background levels is !, and adjacent foreground levels is !. The aggregation level of the fundamental segment may be the dominant level, and the aggregation level of the remaining segments may be proximate the center intensity scale level is each segment. In a typical stroke based image, most of the pixels and most of the potential for run-length compression is in the background. The background may be segmented and aggregated independently of the foreground.

The determination of the fundamental background segment (or foreground segment) may be based on various other factors. The area of the fundamental background segment (or foreground segment) may be a percentage of the area of the background peak (or foreground peak. The width of the fundamental background segment (or foreground segment) may be the width of the peak at a certain height such the half height or the 3 db height.

The determination of the fundamental segment (and the remainder of the non-linear series) effects the image quality of the resulting aggregated image data. The loss of the decimated greyscale levels reduce the greyscale resolution of the image. The greyscale decimation also allows the compression and lower memory requirements. This trade-off between image quality and mapping compression "fixes" the acceptable degree of greyscale decimation. The optimum non-linear series for each stroke font, paper tint, ink shade etc. maybe included in a look-up table for selection by the user as required. Alternatively, the optimum segment series may be determined during each scanning situation by comparing the resulting aggregated image quality with the compression benefits obtained. A high level of low coefficient classifications (or touching characters) during OCR suggests too much greyscale decimation.

AGGREGATION LEVELS (FIG. 2)

One of the intensity scale levels within each aggregation segment along the scale of intensity is selected as the aggregation level (a, b, c, . . . x, y, or z) for that segment. The aggregation level for a multiple level segment may be the minimum level within that segment. If every segment in the series has a minimum aggregation level, then the highest intensity scale of the foreground pixels are lost through aggregation. The foreground in such a minimum aggregation level embodiment appears less intense or down-shade from the original record document. Alternatively, the aggregation levels may be maximum level within each segment, causing the lowest intensity scale of the background pixels to be lost through aggregation. The background in such a maximum aggregation level embodiment appears more intense or up-shade from the original record document. The white background of the record document becomes grey tinted.

The aggregation level for a multiple level segment may be any level between the minimum and maximum levels, such as the middle level. In such a middle level embodiment, both the down-shade of the foreground and the up-shade of the background are reduced. In a more complex embodiment, the aggregation level for each multiple level segment may systematically change position within the segment along the scale of intensity from the background to the foreground. The aggregation level may be the minimum level at the minimum end, the maximum level at the maximum end, and progressively increase in the segments therebetween. As a result, the foreground down-shading and the background up-shading are eliminated.

The stroke foreground pixels and non-stroke background pixels are aggregated into multiple level segments with partial loss of intensity scale information. The transition ground pixels are single level segments of preserved intensity scale information.

INFORMATION CONTENT (FIG. 3)

The regions of the image data histogram that have high information content for the user are preserved by short single level segments. The regions of low information content are partially lost through mapping compression by the large multiple segments. In the image text example, the greyscale (or colorscale) in the center region contains most of the information content. However, any region may be of special interest to the user depending on the application. Small hump 32P (see FIG. 3) near the low intensity end of the center greyscale region, represent oil deposits on the original record document caused by fingerprints. The oil deposits is a very thin film of low pigment content and appears much fainter than the foreground text of the record. In a database directed toward preserving fingerprint information, fingerprint hump 32P would be within a single level region. Small hump 32R near the high intensity end of the center greyscale region, represent pigment deposits on the original record document caused by a red legend stamped in the margin of the text. The red pigment is darker than fingerprints but not as dark as the black ink of the text. In a database directed toward preserving special information such as the presence of a red (or other color) confidential legend, red pigment hump 32R would be within a single level region. The region of single level segments has a low end near background segment and a high end near foreground segment. These "near" segments divide the histogram between the non-linear, partial loss background and foreground regions and the linear single level, preserved transition ground center region. The near segments form points of inflection between the non-linear.

CONCLUSION

Clearly various changes may be made in the structure and embodiments shown herein without departing from the concept of the invention. Further, features of the embodiments shown in the various figures may be employed with the embodiments of the other figures.

Therefore, the scope of the invention is to be determined by the terminology of the following claims and the legal equivalents thereof.

I claim as my invention:

1. A method of non-linearly aggregating pixel data into aggregation segments and storing the pixel data comprising the steps of:

retrieving pixel data from a data source, the pixel data having levels of intensity scale defining information contained within the pixel data, the intensity scale levels extending along a scale of intensity from a minimum intensity end to a maximum intensity end with center intensity scale levels therebetween;

defining a non-linear series of short and extended aggregation segments along the scale of intensity of the retrieved pixel data, the short segments in the series having the same length formed by S levels of intensity scale, and the extended segments in the series having varying lengths formed by more than S levels of intensity scale;

determining an aggregation level within each aggregation segment of the segmented scale of intensity, each aggregation level corresponding to an intensity scale level within the aggregation segment;

aggregating the intensity scale levels within each aggregation segment of the segmented scale of intensity, by setting all of the intensity scale levels therein to the aggregation level for that segment, which introduces partial loss of intensity scale information in the aggregation segments, the amount of intensity scale information lost from each aggregation segment is greater for the extended segments; and storing the non-linearly aggregated pixel data in data storage means.

2. The method of claim 1, wherein the short segments have high intensity scale information content and the extended segments have low intensity scale information content.

3. The method of claim 2, wherein the segmented scale of intensity has a region of adjacent short segments.

4. The method of claim 3, wherein the extended segments near the minimum intensity end and near the maximum intensity end are the longest of the aggregation segments and the extended segments become shorter toward the region of adjacent short segments.

5. The method of claim 2, wherein the number of intensity scale levels included in the extended segments progressively changes along the scale of intensity.

6. The method of claim 5, wherein the extended segments include progressively fewer intensity scale levels along the scale of intensity from the minimum intensity end toward the maximum intensity end.

7. The method of claim 5, wherein the extended segments include progressively more intensity scale levels along the scale of intensity from the minimum intensity end toward the maximum intensity end.

8. The method of claim 5, wherein the extended segments include progressively fewer intensity scale levels along the scale of intensity from the minimum intensity end toward the center intensity scale levels, and include progressively fewer intensity scale levels along the scale of intensity from the maximum intensity end toward the center intensity scale levels.

9. The method of claim 1, wherein the number of intensity scale levels S in each short aggregation segment is 2, and the number of intensity scale levels in each extended aggregation segment is greater than 2.

10. The method of claim 1, wherein the number of intensity scale levels S in each short aggregation segment is 1 forming a single level segment preserving all intensity scale information in the single level segments, and the number of intensity scale levels in each extended aggregation segment is greater than 1 forming a multiple level segment.

11. The method of claim 10, wherein the retrieved pixel data contains stroke based symbols formed by stroke foreground pixels having intensities near one end of the scale of intensity, and non-stroke background pixels having intensities near the other end of the scale of intensity, and transition ground pixels having intensities near the center of the scale of intensity, the transition ground pixels forming a transition interface between the stroke foreground and the non-stroke background.

12. The method of claim 11, wherein the stroke foreground pixels are aggregated into multiple level segments with partial loss of intensity scale information, and non-stroke background pixels are aggregated into multiple level segments with partial loss of intensity scale information, and transition ground pixels are single level segments of preserved intensity scale information.

13. The method of claim 11, wherein during the retrieving step the pixel data containing the stroke based symbols is retrieved from a data memory means.

14. The method of claim 11, wherein the step of retrieving the pixel data containing the stroke based symbols includes the following steps:
scanning a data source document to obtain analog pixel data of the stroke based symbols; and
converting the analog pixel data into digital pixel data.

15. The method of claim 14, wherein the step of defining a series of aggregation segments is accomplished by an intensity scale mapping device which receives the digital pixel data and maps each intensity scale level therein to a segment of the series of aggregation segment.

16. The method of claim 15, wherein the step of determining an aggregation level within each aggregation segment is accomplished by the intensity scale mapping device which assigns an intensity scale level within each aggregation segment as the aggregation level therefor.

17. The method of claim 16, wherein the step of aggregating the intensity scale levels within each aggregation segment is accomplished by the intensity scale mapping device which maps all of the intensity scale levels within each aggregation segment to the aggregation level therefor.

18. The method of claim 14, wherein the data source document has a light background intensity and the strokes thereon have a dark foreground intensity.

19. The method of claim 18, wherein the light background intensity has a background color hue and the dark foreground intensity has a foreground color hue.

20. The method of claim 18, wherein the light background intensity is white and the dark foreground intensity is black.

21. The method of claim 11, wherein the step of defining a non-linear series of aggregation segments comprises:
identifying a dominant background intensity scale level near the background end of the scale of intensity having the most background pixels;
determining a fundamental background aggregation segment having B intensity scale levels which includes the dominant background level;
defining a non-linear series of background aggregation segments each having a progressively decreasing number of intensity scale levels, beginning with the fundamental background segment of B intensity scale levels and continuing with smaller segments to a lower limit of one intensity scale level.

22. The method of claim 21, wherein the step of identifying the dominant background level further comprises the steps of:
providing histogram data which reveals the number pixels in each intensity scale levels in the background end of the scale of intensity, and
selecting the background intensity scale level having the most pixels.

23. The method of claim 21, wherein the fundamental background segment extends from the background end of the scale of intensity toward the center intensity scale levels, and includes the dominant background level plus a pre# of adjacent intensity scale levels on the center side of the dominant background level.

24. The method of claim 21, wherein the aggregation level of the fundamental background segment is the dominant background level.

25. The method of claim 21, wherein the aggregation level of the fundamental background segment is the dominant background level, and the aggregation level of the remaining segments is proximate the center intensity scale level is each segment.

26. The method of claim 11, wherein the step of defining a non-linear series of aggregation segments comprises:
identifying a dominant foreground intensity scale level near the foreground end of the scale of intensity having the most foreground pixels;
determining a fundamental foreground aggregation segment having F intensity scale levels which includes the dominant foreground level;
defining a non-linear series of foreground aggregation segments each having a progressively decreasing number of intensity scale levels, beginning with the fundamental foreground segment of F intensity scale levels and continuing with smaller segments to a lower limit of one intensity scale level.

27. The method of claim 26, wherein the step of identifying the dominant foreground level further comprises the steps of:

providing histogram data which reveals the number pixels in each intensity scale levels in the foreground end of the scale of intensity, and selecting the foreground intensity scale level having the most pixels.

28. The method of claim 26, wherein the fundamental foreground segment extends from the foreground end of the scale of intensity toward the center intensity scale levels, and includes the dominant foreground level plus a pre# of adjacent intensity scale levels on the center side of the dominant foreground level.

29. The method of claim 26, wherein the aggregation level of the fundamental foreground segment is the dominant foreground level.

30. The method of claim 26, wherein the aggregation level of the fundamental foreground segment is the dominant foreground level, and the aggregation level of the remaining segments is proximate the center intensity scale level is each segment.

31. The method of claim 1, wherein the aggregation level within each multiple level segment along the scale of intensity is the minimum intensity scale level within that segment.

32. The method of claim 1, wherein the aggregation level within each multiple level segment along the scale of intensity is the maximum intensity scale level within that segment.

33. The method of claim 1, wherein the aggregation level within each multiple level segment along the scale of intensity is the minimum intensity scale level within the segment at the minimum end of the scale of intensity, and is the maximum intensity scale level within the segment at the maximum end of the scale of intensity, and progressively increases towards the maximum intensity scale level along the scale of intensity toward the maximum end.

34. The method of claim 1, after the aggregating step and before the storing step, comprising the additional step of:

compressing the aggregated pixel data to reduce the storage requirements thereof.

35. The method of claim 34, wherein the step of compressing is run-length encoding.

36. Apparatus for non-linearly aggregating pixel data into aggregation segments and the storing pixel data, comprising:

data source means providing the pixel data having levels of intensity scale which define the information contained within the pixel data, the intensity scale levels extending along a scale of intensity from a minimum intensity end to a maximum intensity end with center intensity scale levels therebetween;

retrieval means for retrieving the pixel data from the data source means;

definition means responsive to the pixel data retrieved by the retrieval means, for defining a non-linear series of short and extended aggregation segments along the scale of intensity, the short segments in the series having the same length formed by S levels of intensity scale, and the extended segments in the series having varying lengths formed by more than S levels of intensity scale;

determination means responsive to the series of aggregation segments from the definition means, for determining an aggregation level within each aggregation segment, each aggregation level corresponding to an intensity scale level within the aggregation segment;

aggregation means responsive to the aggregation segments and the aggregation levels therein, for aggregating the intensity scale levels within each aggregation segment by setting all of the intensity scale levels to the aggregation level for that segment, which introduces partial loss of intensity scale information in the aggregation segments, the amount of intensity scale information lost from each aggregation segment is greater for the extended segments; and data storage means for storing the non-linearly aggregated pixel data in data storage means.

37. The apparatus of claim 36, wherein the segmented scale of intensity has a center region of adjacent short aggregation segments having high intensity scale information content, and regions of extended aggregation segments having low intensity scale information content near the minimum intensity end and near the maximum intensity end, which extended regions become shorter toward the region of adjacent short aggregation segments.

38. The apparatus of claim 37, wherein the number of intensity scale levels S in each short aggregation segment is 1 forming a single level segment in which all intensity scale information is preserved, and the number of intensity scale levels in each extended aggregation segment is greater than 1 forming a multiple level segment.

39. The apparatus of claim 36, wherein the retrieved pixel data contains stroke based symbols formed by stroke foreground pixels having intensities near one end of the scale of intensity which are aggregated into multiple level segments with partial loss of intensity scale information, and non-stroke background pixels having intensities near the other end of the scale of intensity which are aggregated into multiple level segments with partial loss of intensity scale information, and transition ground pixels having intensities near the center of the scale of intensity which are single level segments of preserved intensity scale information, the transition ground pixels forming a transition interface between the stroke foreground and the non-stroke background.

40. The apparatus of claim 39 wherein the data source means is a data source document, and wherein the retrieval means further comprises:

scanning means for scanning a data source document to obtain analog pixel data of the stroke based symbols; and converting means for converting the analog pixel data into digital pixel data.

41. The apparatus of claim 40, wherein the definition means for defining the series of aggregation segments is an intensity scale mapping device which receives the digital pixel data and maps each intensity scale level therein to a segment of the series of aggregation segments.

42. The apparatus of claim 41, wherein the determination means for determining an aggregation level within each aggregation segment is included in the intensity scale mapping device which assigns an intensity scale level within each aggregation segment as the aggregation level therefor.

43. The apparatus of claim 42, wherein the aggregation means for aggregating the intensity scale levels within each aggregation segment is included in the intensity scale mapping device which maps all of the intensity scale levels within each aggregation segment to the aggregation level therefor.

44. The apparatus of claim 39, wherein:

the non-linear series of aggregation segments has a dominant background intensity scale level near the background end of the scale of intensity having the most background pixels and a dominant foreground intensity scale level near the foreground end of the scale of intensity having the most foreground pixels;

the non-linear series of aggregation segments has a fundamental background aggregation segment having B intensity scale levels including the dominant background level as the aggregation level therein, and a fundamental foreground aggregation segment having F intensity scale levels including the dominant foreground level as the aggregation level therein;

the aggregation segments have a progressively decreasing number of intensity scale levels, beginning with the fundamental segments and continuing with smaller segments to a lower limit of one intensity scale level.

45. A method of processing a pixel image comprising the steps of:

retrieving an input pixel image having levels of intensity extending along a scale of intensity from a minimum intensity end to a maximum intensity end with center intensity scale levels therebetween;

generating an intensity histogram of the input pixel image having N intensity levels along the scale of intensity;

defining M segments of intensity levels in the input image based on the intensity histogram, including a foreground segment formed by pixels near one end of the scale of intensity and a background segment formed by pixels near the other end of the scale of intensity and center segments therebetween, in which is M<N;

setting an aggregation level value within each of the M segments of intensity levels defining a non-linear series of M aggregation levels; and converting the input image of N intensity levels to a converted image of M intensity levels.

46. The method of claim 45 comprising the additional step of data compression of the converted image.

47. The method of claim 46 wherein the data compression is lossless compression.

* * * * *